(12) United States Patent
Ikegami et al.

(10) Patent No.: US 6,209,929 B1
(45) Date of Patent: Apr. 3, 2001

(54) CONNECTOR FOR MOUNTING A SPIRAL PIPE ONTO A WALL MEMBER

(75) Inventors: Hiroshi Ikegami; Yasuhiro Kikumori; Noboru Someda; Yoshiaki Tatsuta; Toshifumi Fujiwara; Toshio Morimatsu, all of Osaka (JP)

(73) Assignee: Totaku Industries, Inc., Osaka (JP)

( * ) Notice: Subject to any disclaimer, the term of this patent is extended or adjusted under 35 U.S.C. 154(b) by 0 days.

(21) Appl. No.: 09/270,043

(22) Filed: Mar. 16, 1999

(30) Foreign Application Priority Data

Mar. 17, 1998 (JP) .................................................. 10-089267

(51) Int. Cl.⁷ ...................................................... F16L 5/02
(52) U.S. Cl. ...................... 285/139.2; 285/206; 285/903; 285/906
(58) Field of Search ............................... 285/139.1, 139.2, 285/139.3, 903, 141.1, 143.1, FOR 143, 206, 207, 208, 209, 210, 216, 137.11, 906

(56) References Cited

U.S. PATENT DOCUMENTS

| 980,901 | * | 1/1911 | Ballantyne | 285/208 |
|---|---|---|---|---|
| 1,192,927 | * | 8/1916 | Mosher | 285/215 |
| 1,775,128 | * | 9/1930 | Hunter | 285/207 |
| 3,076,668 | * | 2/1963 | Famely | 285/137.11 |
| 3,221,572 | * | 12/1965 | Swick | 285/209 |
| 4,457,544 | * | 7/1984 | Snow et al. | 285/903 |

FOREIGN PATENT DOCUMENTS

2011484 * 7/1992 (WO) ................................... 285/319

* cited by examiner

Primary Examiner—Dave W. Arola
(74) Attorney, Agent, or Firm—McGuireWoods LLP

(57) ABSTRACT

A connector for mounting a pipe member (P) having a spiral-shaped wall to a through hole (h) formed in a wall member (W), the connector comprises a bellmouth (1), a holder (2) and a waterproof packing member (3). The bellmouth (1) includes an engaging projection (13) which is formed on the outer periphery (12) of a cylindrical-shaped portion (11) thereof and is engageable with the inner peripheral surface of the pipe member (P). The holder (2) includes a spiral-shaped projection (23) which is formed on the inner peripheral surface (22) of a cylindrical-shaped portion (21) thereof and fittingly engageable with the outer periphery spiral-shaped portion of the pipe member (P). The waterproof packing member (3) is disposed between the wall member (W) and the holder (2).

16 Claims, 14 Drawing Sheets

CONNECTOR FOR MOUNTING A SPIRAL PIPE ONTO A WALL MEMBER

BACKGROUND OF THE INVENTION

The present invention relates to a spiral pipe mounting connector which, when a cable protect pipe line for an electric cable, a telephone cable, an optical cable and the like is embedded into the ground, is used to connect a spiral pipe to a hand hole, a manhole and the like to be disposed as a relay for the cables.

Conventionally, when laying a cable pipe line in the ground, as a relay for a cable, there are formed hand holes or manholes (which will be hereinafter referred to as a hand hole for representing both of the hand hole and manhole) at every proper intervals in the cable pipe line. To form the hand hole, as shown in FIG. 2, the ground is dug by a desired depth to form a hole, and concrete is then placed into the thus dug hole to thereby form the peripheral wall (side wall) of a hand hole H. At the same time when the hand hole H is formed, in the side wall of the hand hole H, there is formed a through hole h which communicates both of the exterior and interior of the hand hole H and is used to connect a pipe member P for forming the cable pipe line. That is, the pipe member P for forming the cable pipe line is connected to the through hole h.

And, conventionally, in order to connect the pipe member P to the side wall W of the hand hole H, mortar is charged into a gap formed between the through hole h of the side wall W and the pipe member P inserted into the through hole h and the mortar is hardened to thereby fix the pipe member P to the hand hole H as well as prevent water from penetrating into the hand hole H.

However, in the above-mentioned conventional method or structure for connecting a pipe member P to a hand hole H, the mortar charging operation requires experience, the need to secure the water preventive condition requires time and labor, there is needed an operation to prevent the leakage of the mortar, and there is needed the time for waiting for the hardening of the mortar. Therefore, even when the connection of the pipe member P to the hand hole H is completed, it is not possible to carry out immediately an operation to insert and wire an electric cable or the like into the pipe member P.

SUMMARY OF THE INVENTION

The present invention aims at eliminating the drawbacks found in the above-mentioned conventional connecting means for connecting the pipe member P to the hand hole H. Accordingly, it is an object of the invention to provide entirely new manner, that is, an entirely new spiral-shaped pipe member mounting connector in which an operation to mount and fix a pipe member to a hand hole can be executed quite easily and quickly and, as soon as the pipe member mounting and fixing operation is completed, an operation to wire and insert an electric cable or the like into the pipe member can be executed.

Also, it is another object of the invention to provide a spiral-shaped pipe member mounting connector which allows the pipe member mounting and fixing operation to be executed quite easily and quickly not only regardless of the thicknesses of the wall members and the uneven surfaces or deformed surfaces of the wall members but also regardless of the size of a pipe member mounting through hole formed in the side wall of the hand hole.

The above-object can be attained by a connector for mounting a pipe member having a spiral-shaped wall to a through hole (h) formed in a wall member, the connector according to the present invention comprising:

a bellmouth including an engaging projection which is engageable with the inner peripheral surface of the pipe member and a flange radially extended in a radial direction thereof;

a holder including a spiral-shaped projection which is formed on the inner peripheral surface of a cylindrical-shaped portion thereof and fittingly engageable with the outer periphery spiral-shaped portion of the pipe member; and a waterproof packing member disposed on at least one of a position between the wall member and the holder and a position between the wall member and the flange.

In the above-mentioned construction of the connector according to the present invention, it is preferable to further comprises:

a C-shaped ring including a barrel portion with a cut groove extending in the axial direction thereof, and a flange portion projecting in the radial direction thereof, the C-shaped ring being disposed on the opposing side to the watertight packing member about the wall member and also being disposed on at least one of a position between the wall member and the holder and a position between the wall member and the flange of the bellmouth; and a cylindrical-shaped tapered spacer which can be fitted into the C-shaped ring, to thereby spread out the barrel portion of the C-shaped body, wherein the barrel portion and an cylindrical-shaped tapered portion of the cylindrical-shaped tapered spacer are interposed between the wall member and the pipe member in a radial direction of the pipe member.

In the above-mentioned construction of the connector according to the present invention, it is more preferable to further comprises:

a washer member interposed on at least one of a position between the watertight packing member and the flange of the bellmouth and a position between the watertight packing member and the holder.

In the above-mentioned construction of the connector according to the present invention, it is moreover preferable that the wall member is a side wall forming a hand hole or a manhole.

In attaining the above object, according to the invention, there is provided a spiral-shaped pipe member mounting connector relating to the first structure. Referring to the present spiral-shaped pipe member mounting connector by means of reference characters used in the embodiments thereof, the connector is a connector for mounting a pipe member P having a spiral-shaped wall to a through hole h formed in a wall member W, and in particular, the connector comprises: a bellmouth 1 including on the outer periphery 12 of a cylindrical-shaped portion 11 thereof a plurality of engaging projections 13 engageable with the inner peripheral surface of said pipe member P; a holder including on the inner peripheral surface 22 of a cylindrical-shaped portion 21 thereof a spiral-shaped projection 23 which can be fitted with the outer periphery spiral-shaped portion of the pipe member P; and a watertight packing member 3 disposed on the wall member W side of the holder 2.

Also, according to the invention, there is provided a spiral-shaped pipe member mounting connector relating to a second structure. The present connector, as described above, is a connector which is used to connect the spiral-shaped pipe member P to the through hole h formed in the wall member W. In particular, the present connector comprises: a bellmouth 1 including on the outer periphery 12 of a cylindrical-shaped portion 11 thereof a plurality of engaging projections 13 engageable with the inner peripheral spiral-shaped portion of the pipe member P, and also including, one end side thereof, a flange 14 projecting in the outer peripheral direction thereof; a fastening holder including on the inner peripheral surface 22 of a cylindrical-shaped portion 21 thereof a spiral-shaped projection 23 fittable with the outer periphery spiral-shaped portion of the pipe member P; a watertight, annular-shaped packing member 3 disposed on the wall member W side of the flange 14 of the bellmouth 1 or on the wall member W side of said holder 2; a C ring 5 disposed on the opposing side to the watertight packing member 3 with the wall member W between them, in particular, on the wall member W side of the holder 2 or on the wall member W side of the flange 14 of the bellmouth 1, while the C ring 5 includes a barrel portion 51 having a cut groove 53 formed so as to extend in the axial direction thereof and a flange portion 52 projecting in the peripheral direction thereof; and, a tapered, cylindrical-shaped spacer 6 which can be fitted into the C ring 5 to thereby spread out the barrel position 51 of the C ring 5.

DETAILED DESCRIPTION OF THE PREFERRED EMBODIMENTS

Figure 1:
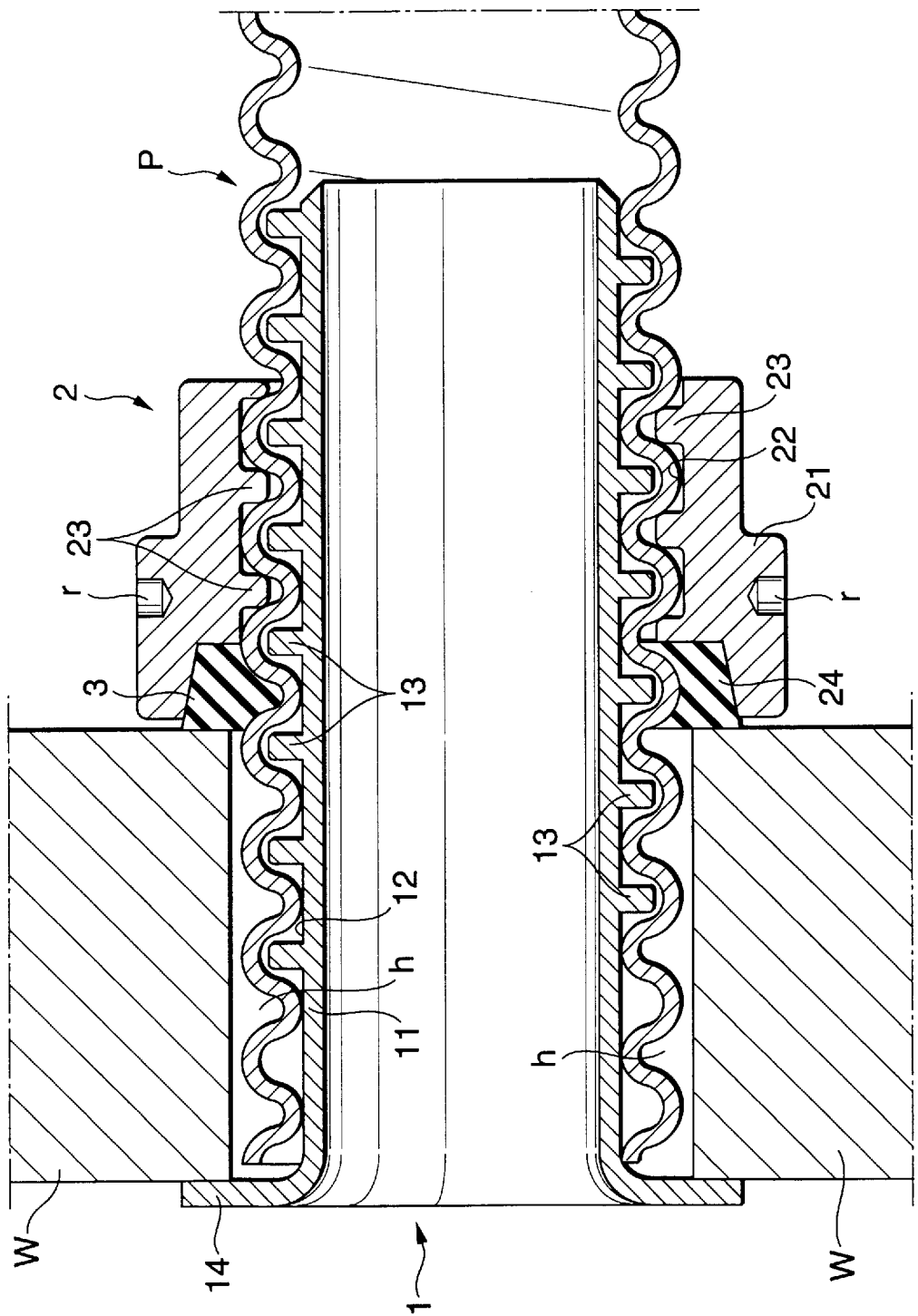
FIG. 1 is a longitudinal section view of the main portions of a first embodiment of a connector relating to a first structure according to the invention.

At first, the term "wall member W" used herein means not only the above-mentioned peripheral side wall of the hand hole or manhole H but also other wall members; and also, the wall member W may be a vertical wall as well as a horizontal wall. However, a connector according to the invention can be applied only to a pipe member, the outer peripheral surface of which is formed in a spirally corrugate shape; that is, a connector according to the invention is not applied to a pipe having a smooth, cylindrical-shaped outer peripheral surface, nor to a pipe the outer peripheral surface of which is formed in an annularly corrugate shape.

According to the invention, the material of the above-mentioned bellmouth 1, holder, washer member 4, C ring 5, and spacer 6 is not limited to special material. However, preferably, they may e injection molded using nonchlorine-system synthetic resin material which is excellent in weather and water resistance, such as hard polyolefin-system resin.

Also, the invention can be enforced in such a manner that a disk-shaped or saucer-shaped washer member 4 is interposed between the watertight packing member 3 and the flange 14 of the bellmouth 1 or the holder 2.

[Embodiments]

Figure 2:
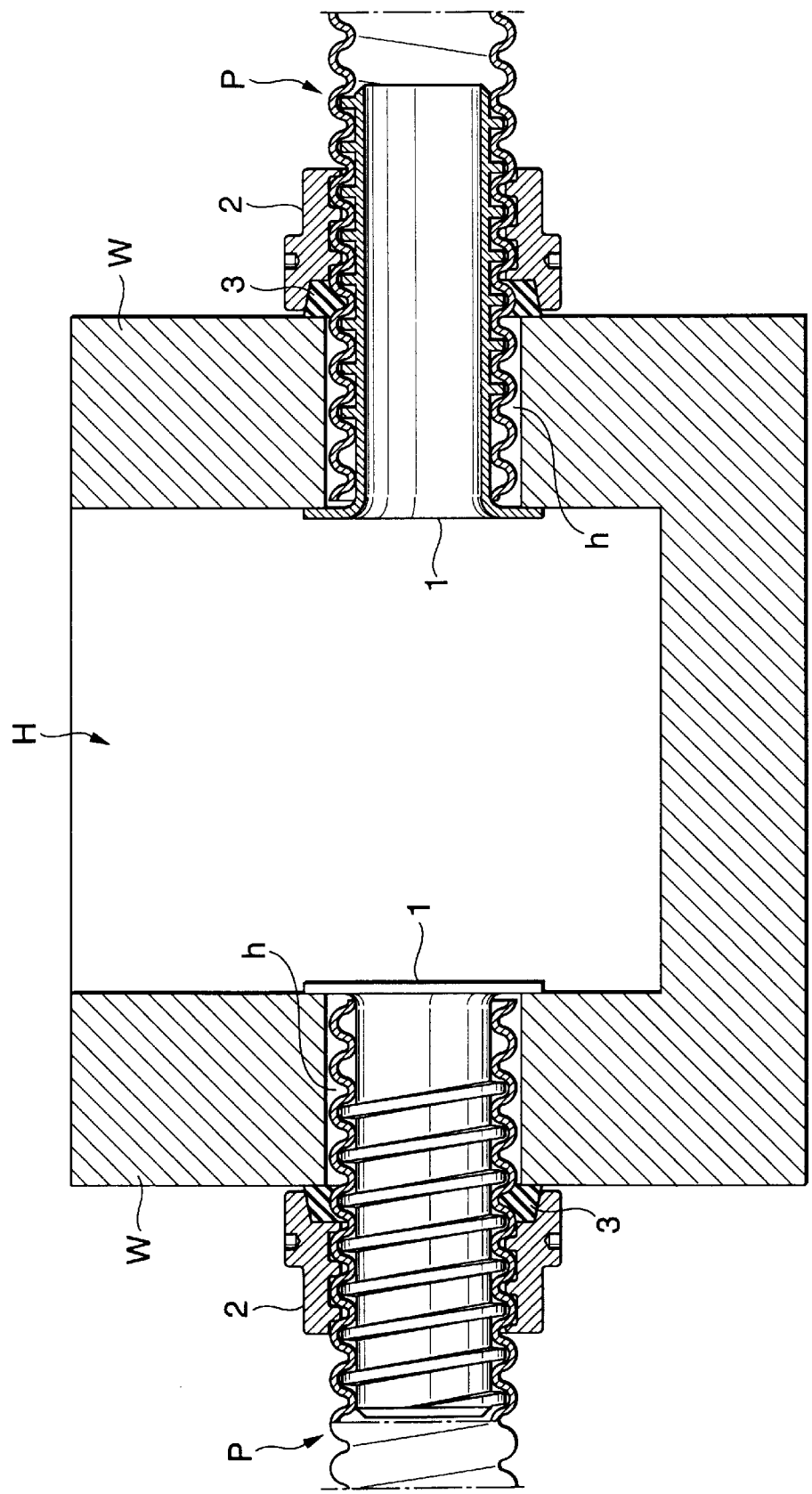
FIG. 2 is a partially longitudinal section view of the first embodiment, showing how the connector is mounted to a hand hole.

Now, description will be given below of the preferred embodiments of a connector according to the invention with reference to the accompanying drawings. In the drawings, FIGS. 1 and 2 show a first embodiment of a connector relating to the above-mentioned first structure according to the invention. In particular, FIG. 1 is a section view of the whole structure of the first embodiment, showing how it is used, and FIG. 2 is a partial section view of the main portions of the first embodiment, showing how it is mounted to a hand hole.

In particular, a connector according to the invention, especially as shown in FIG. 1 in an enlarged manner, is composed of a bellmouth 1, a holder 2 and a packing member 3. The bellmouth 1, as shown in FIG. 2, comprises a cylindrical-shaped portion 11 which is inserted through the opening end of a pipe member and fitted into the pipe member to be connected to a hand hole H, that is, a pipe member P forming a pipe line for protection of a cable such as an electric wire or the like, and a radially projecting trumpet-shaped flange portion 14 which is used to guide the cable such as the electric wire or the like when the cable is inserted into or pulled out from the pipe member P, while a plurality of spiral-shaped engaging projections 13 to be engaged with the spiral-shaped uneven inner peripheral surface of the pipe member P are integrally provided on and projected from the outer periphery 12 of the cylindrical-shaped portion 11. The holder 2, which is formed in a cylindrical shape as a whole, includes, on the inner peripheral surface 22 side of a cylindrical-shaped portion 21 thereof, a plurality of spiral-shaped projections 23 to be fitted with the spirally corrugate shaped outer peripheral surface of the pipe member P and, on one end face (in FIG. 1, the left end face) side thereof, a circular-shaped recessed portion 24 to be fitted with the packing member 3. The recessed portion 24 according to the present embodiment is formed in such a manner that its outer peripheral surface has an outwardly spreading taper shape. The packing member 3 is formed in a shape which allows the packing member 3 to be fitted into the recessed portion 24 of the holder 2. And, the packing member 3 has a size which, in use, allows not only the inner peripheral side of the packing member 3 to be closely contacted with the outer peripheral surface of the pipe member P but also the outer surface of the packing member 3 to project outwardly of the outer surface of the holder 2.

And, the bellmouth 1 and holder 2 according to the present embodiment are wholly formed of polyethylene resin material by an injection molding method generally well-known, whereas the packing member 3 is formed by molding rubber or highly elastic material mixed with rubber in an annular shape or a half-cut shape.

Next, description will be given below of how to use the thus formed connector when it is used to connect a spiral-shaped pipe member to the hand hole H. At first, while rotating the holder 23 spirally, the spiral-shaped projections 23 of the inner surface of the holder 23 are engaged with the spiral-shaped uneven portions of the outer periphery of the spiral-shaped pipe member P for forming a cable pipe line from the end portion of the pipe member P, so that the spiral-shaped projections 23 are thereby fitted over the pipe member P. In this operation, when the packing member 3 is formed as an annular shape, after the spiral-shaped projections 23 are fitted, the annular-shaped packing member 3 is similarly fitted over the pipe member P. Next, the end portion of the pipe member P, which is located forwardly of the holder fitted-over portion of the pipe member P, is inserted into a through hole h formed in the wall member (side wall) of the hand hole H disposed as a cable relay site, from outside the hand hole H.

Figure 5:
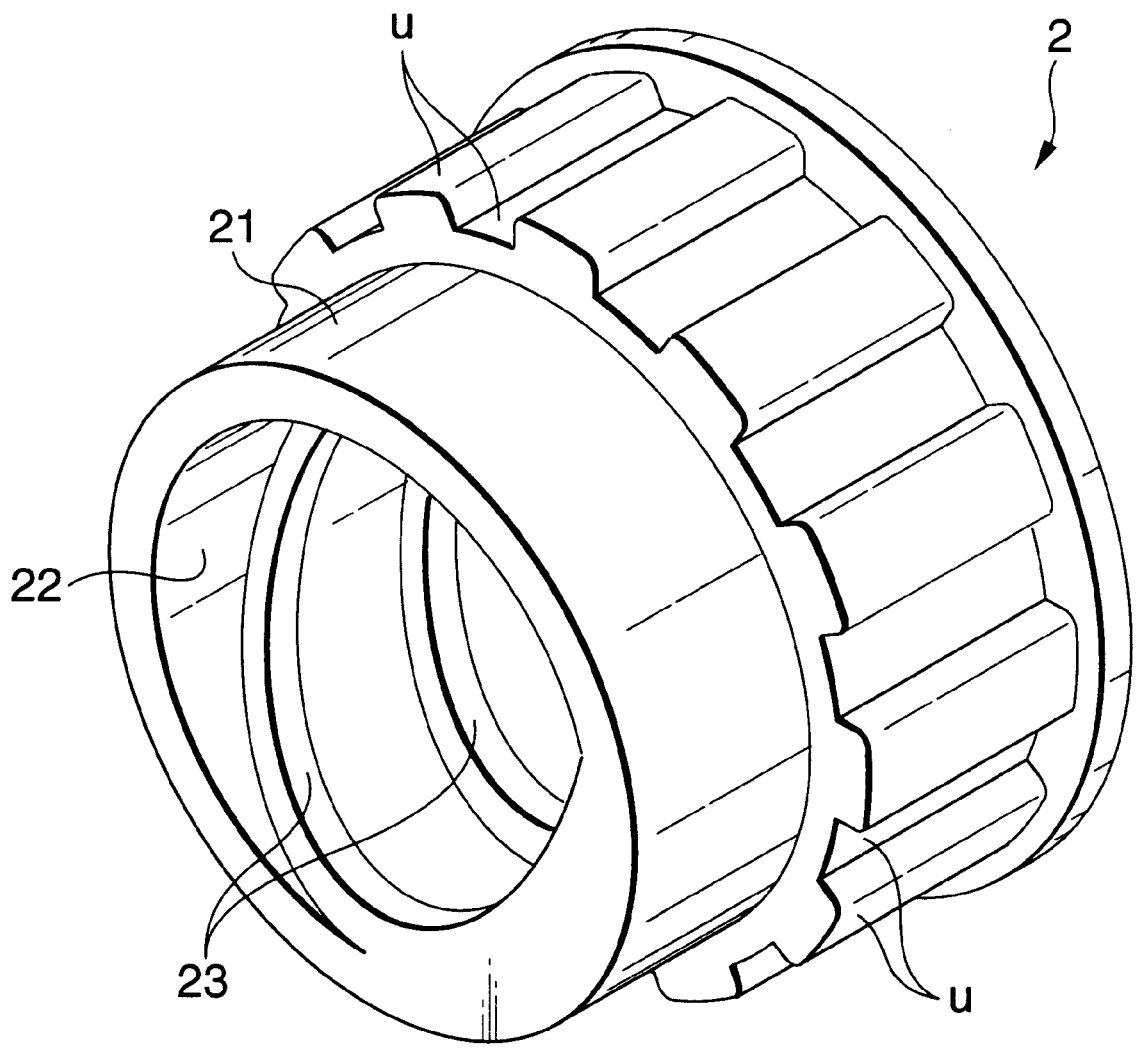
FIG. 5 is a perspective view of a second embodiment of a holder according to the invention.

Next, while rotating the bellmouth 1 spirally, the engaging projections 13, which are provided on and projected from the outer periphery of the bellmouth 1, are engaged with the spiral-shaped uneven portions of the inner surface of the pipe member P to be thereby inserted into the pipe member P, from inside the hand hole H. After the bellmouth 1 is fitted into the pipe member P in this manner, the holder 2 fitted over the outer periphery of the pipe member P is rotated spirally oppositely to the above direction and is thereby moved in the pipe member end direction, and, as shown in FIG. 1, the bottom surface and tapered outer peripheral surface of the circular-shaped recessed portion 24 are pressed against the packing member 3 so that the outer surface of the packing member 3 is pressed against the side wall W, with the inner surface thereof against the outer peripheral surface of the pipe member P. Reference character r, which is shown in FIG. 1, designates an engaging hole which is formed in the outer peripheral surface of the holder 2 and is used to operate or rotate the holder 2. Of course, the engaging hole r is not always necessary; that is, for example, if the outside shape of the holder 2 is formed square, then the holder 2 can be rotated using a proper tool. Also, as shown in FIG. 5, by forming the outside shape of the cylindrical-shaped portion in uneven portions u, the holder 2 can be rotated easily by hand.

Figure 3:
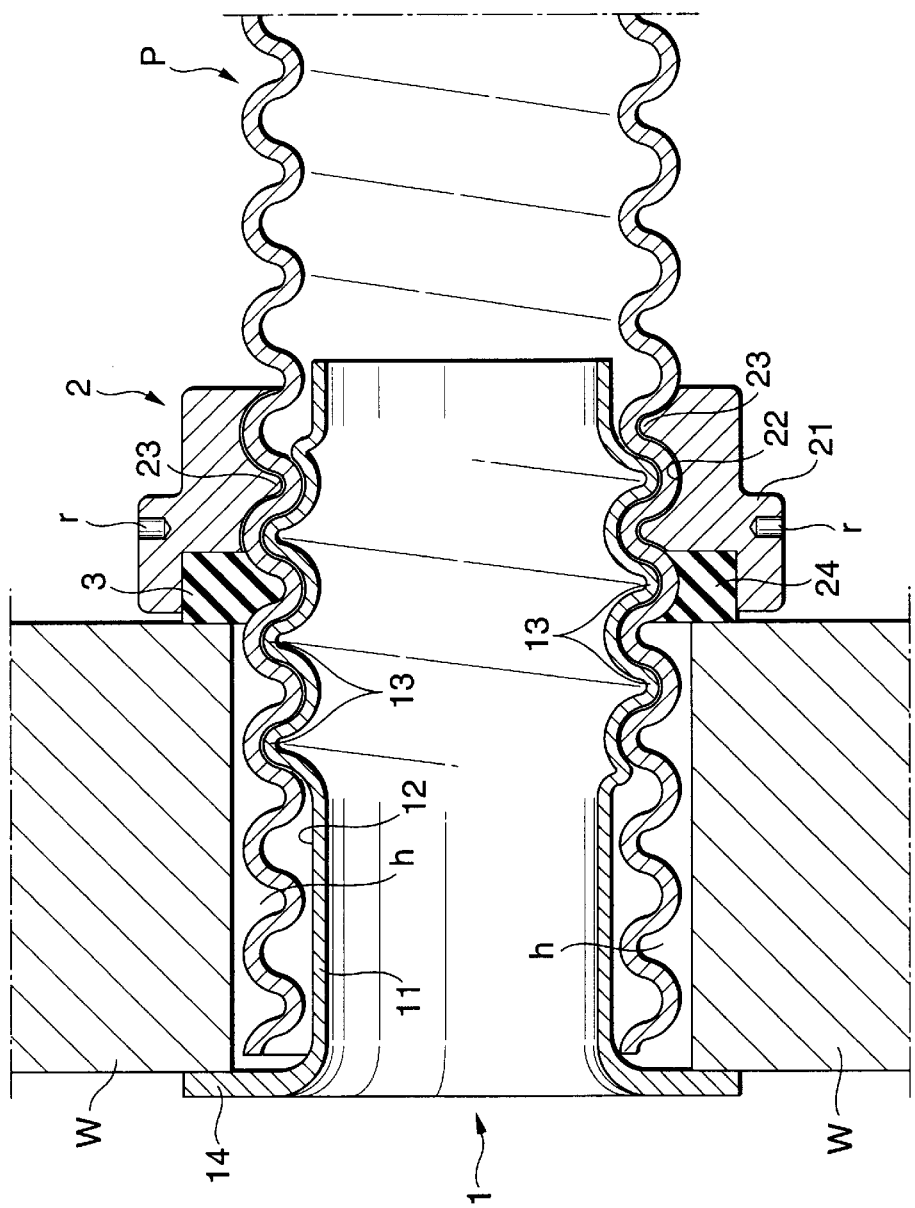
FIG. 3 is a longitudinal section view of the main portions of a second embodiment of a connector relating to the first structure according to the invention, corresponding to FIG. 1.

Now, FIG. 3 is a section view of a second embodiment of a connector relating to the first structure according to the invention, which corresponds to the section view shown in FIG. 1. The second embodiment is different from the first embodiment mainly in the respective shapes of the engaging projections 13 and spiral-shaped projections 23: that is, the engaging projections 13 of the bellmouth 1 to be engaged with the pipe member P are not formed in the rib-shaped projections but in the spiral-shaped uneven portions that are substantially identical in shape with the inner surface uneven portions of the pipe member P; and, the spiral-shaped projections 23 of the holder 2 to be engaged with the pipe member P are not formed in the rib-shaped projections but in the spiral-shaped uneven portions that are substantially identical in shape with the outer peripheral surface uneven portions of the pipe member P. The remaining portions of the second embodiment are almost similar to those of the first embodiment.

Figure 4:
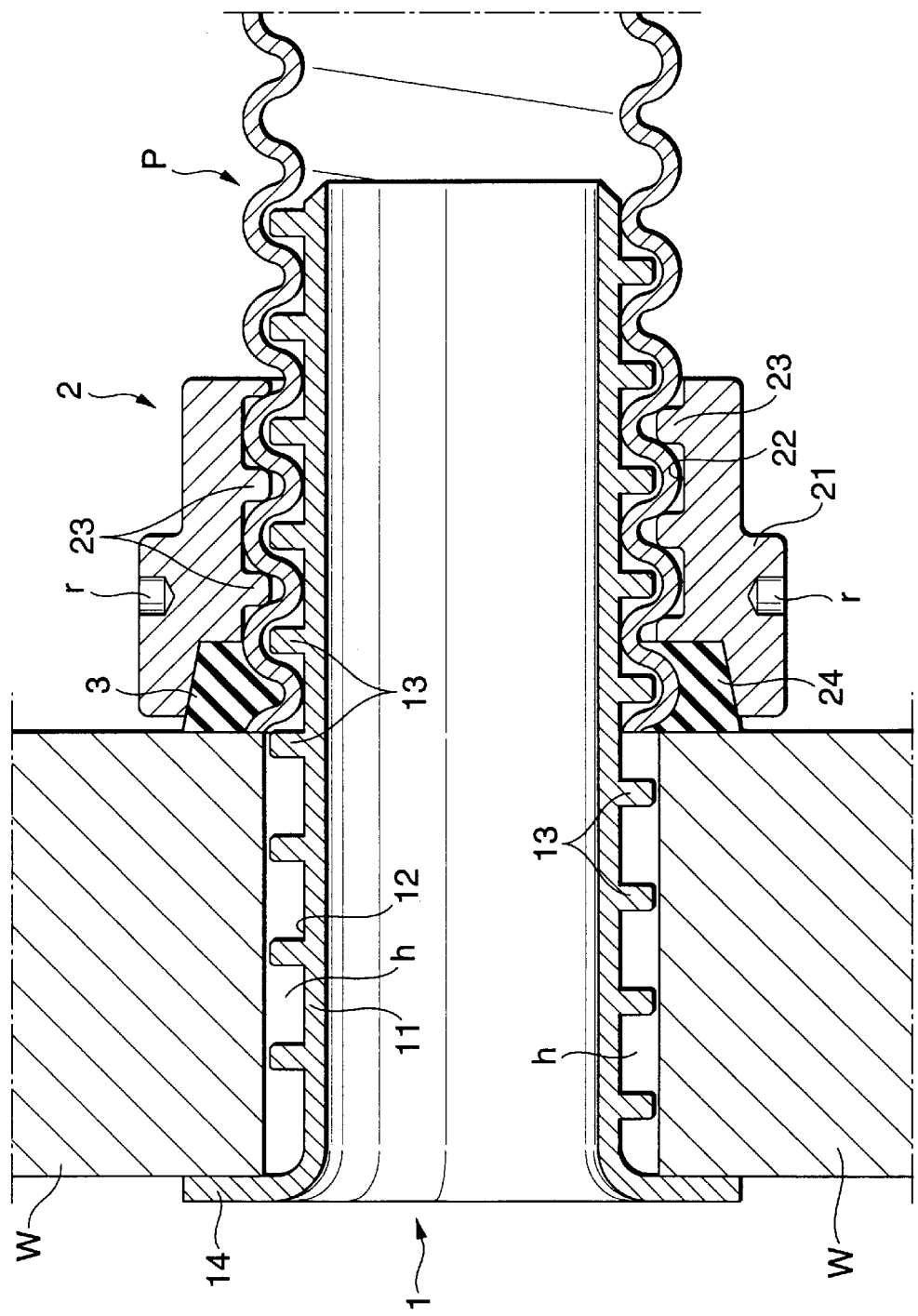
FIG. 4 is a longitudinal section view of the main portions of a third embodiment of a connector relating to the first structure according to the invention, corresponding to FIG. 1.

Also, FIG. 4 shows a third embodiment of a connector relating to the first structure according to the invention, in which the inside diameter of the through hole h formed in the side wall W is set as a small diameter which is substantially equal to the outside diameter of the engaging projection 13 of the bellmouth 1. In the third embodiment, there is eliminated the need to insert the pipe member P into the through hole h as in the first embodiment shown in FIG. 1, and thus the diameter of the through hole h can set small. Therefore, the third embodiment is advantageous in that it can provide an enhanced operation efficiency. Also, referring to the engaging projections 13 provided on the bellmouth 1, as shown in FIG. 4, if they are provided in the portions of the bellmouth 1 that are situated within the through hole h as well, then the bellmouth 1 can be prevented from getting loose or rickety; that is, the bellmouth 1 can be advantageously held in a stable condition. Also, instead of the engaging projections 13 that are situated within the through hole h, other means can also be employed. For example, the portions of the bellmouth 1 that are situated within the through hole h may be formed larger in diameter, or there may be provided ribs which extend along the axis of the cylindrical shape of the bellmouth 1. With use of such means, similarly to the above, the bellmouth 1 can also be prevented from getting loose.

Figure 6:
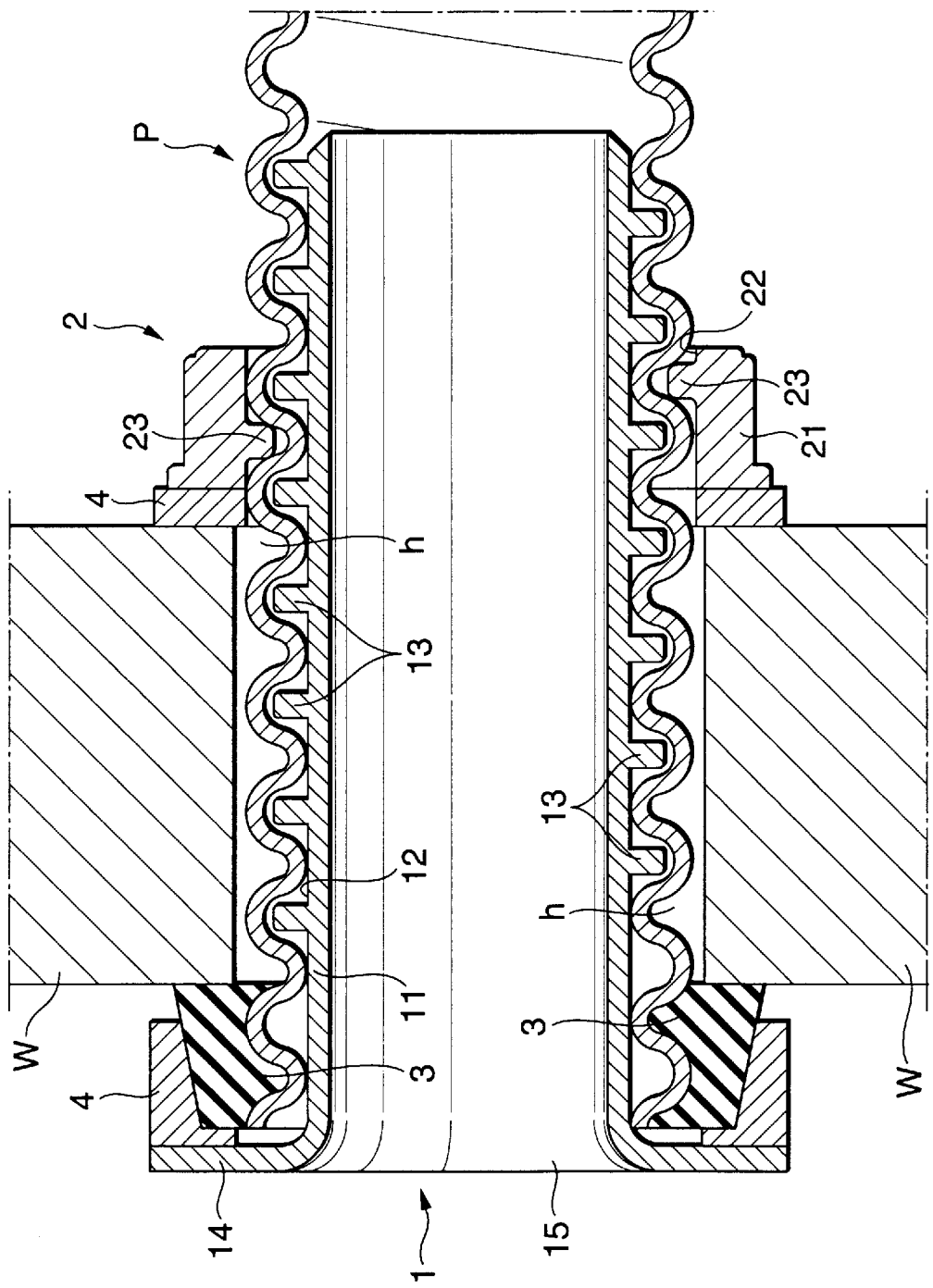
FIG. 6 is a longitudinal section view of the main portions of a fourth embodiment of a connector relating to the first structure according to the invention, corresponding to FIG. 1.

Now, FIG. 6 shows a fourth embodiment of a connector relating to the first structure according to the invention, in which the packing member 3 is disposed on the inner surface side of the side wall W, that is, on the flange 14 side of the bellmouth 1. More specifically, the rubber packing member 3, the outer shape of which is formed in a tapered surface, is disposed on the back surface side of the flange portion 14 of the bellmouth 1 through a washer member 4 including a tapered inner surface which can receive the tapered surface of the rubber packing member 3; whereas, a fastening holder 2 is disposed on the outside of the side wall W through an annular-shaped washer member 4.

Figure 7:
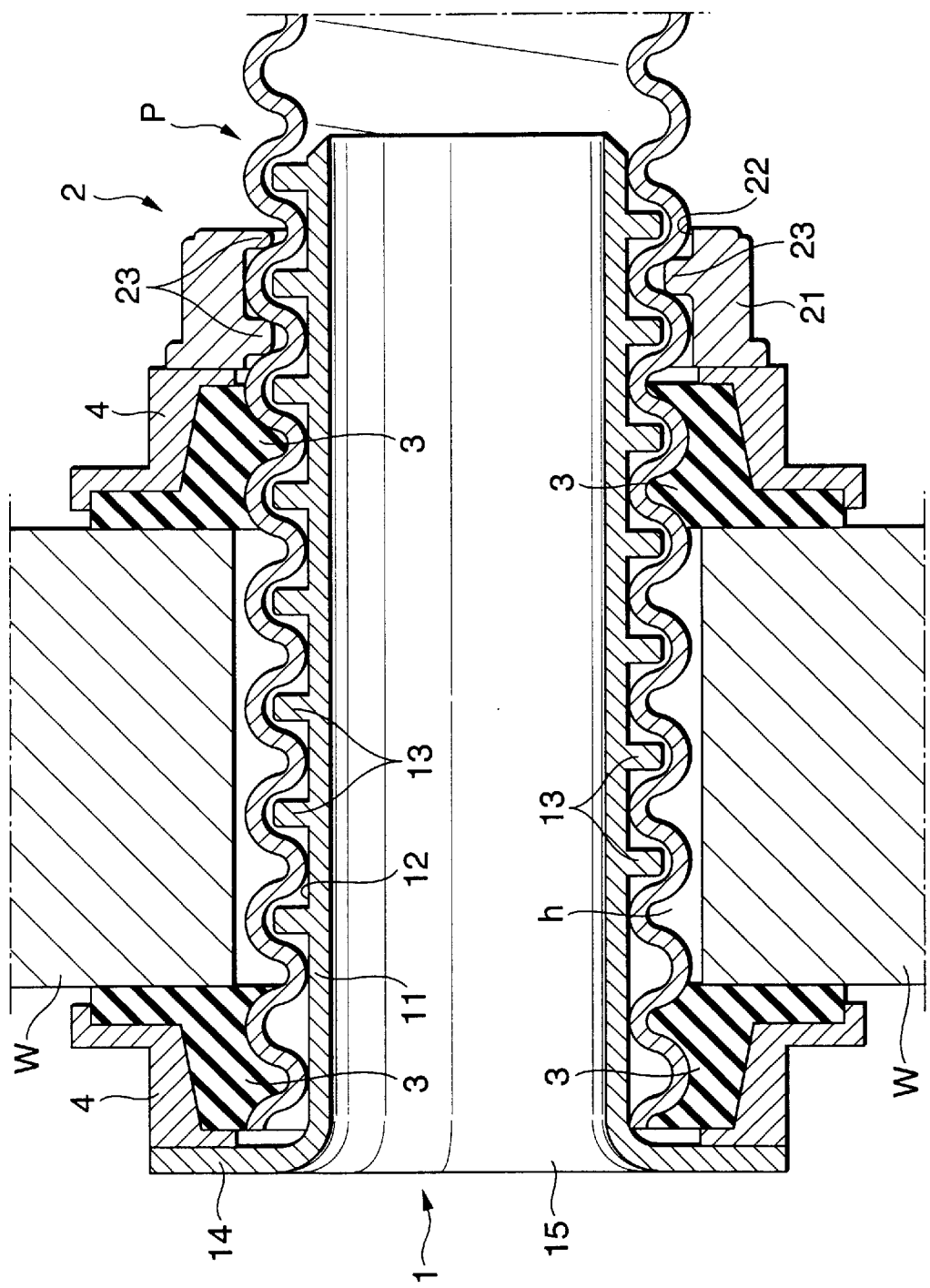
FIG. 7 is a longitudinal section view of the main portions of a fifth embodiment of a connector relating to the first structure according to the invention, corresponding to FIG. 1.

Now, FIG. 7 shows a fifth embodiment of a connector relating to the first structure according to the invention. In the fifth embodiment, the packing member 3 and washer member 4 which, as in the fourth embodiment shown in FIG. 6, are respectively disposed on the back surface side of the flange portion 14 of the bellmouth 1 are similarly disposed on the outside of the side wall W as well in such a manner that they are opposed to each other. That is, as has been described hereinbefore, the first structure according to the invention can be enforced in the above-mentioned manner.

Figure 8:
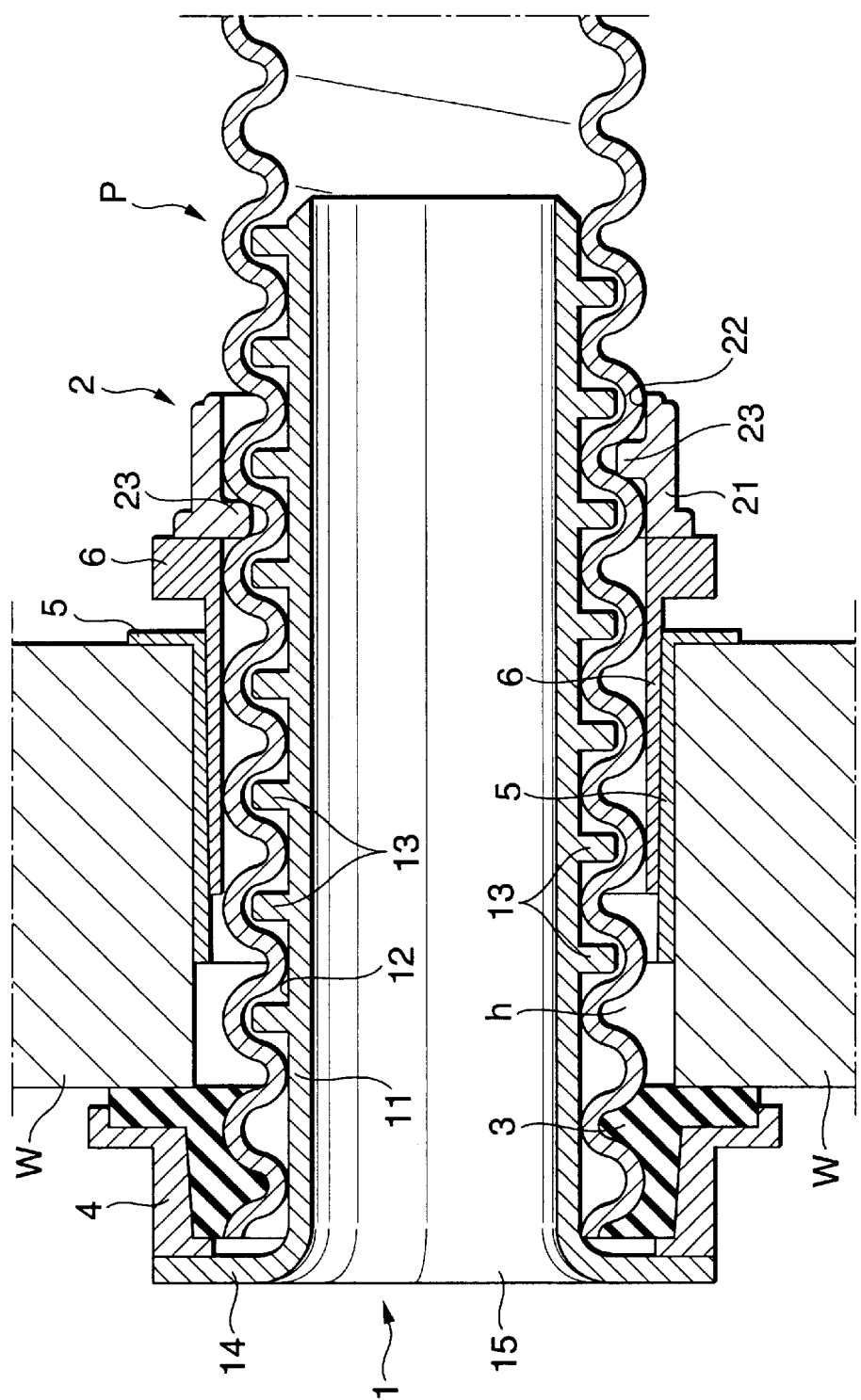
FIG. 8 is a longitudinal section view of a main embodiment of a connector relating to a second structure according to the invention, showing a first embodiment of use of the present embodiment.
Figure 9:
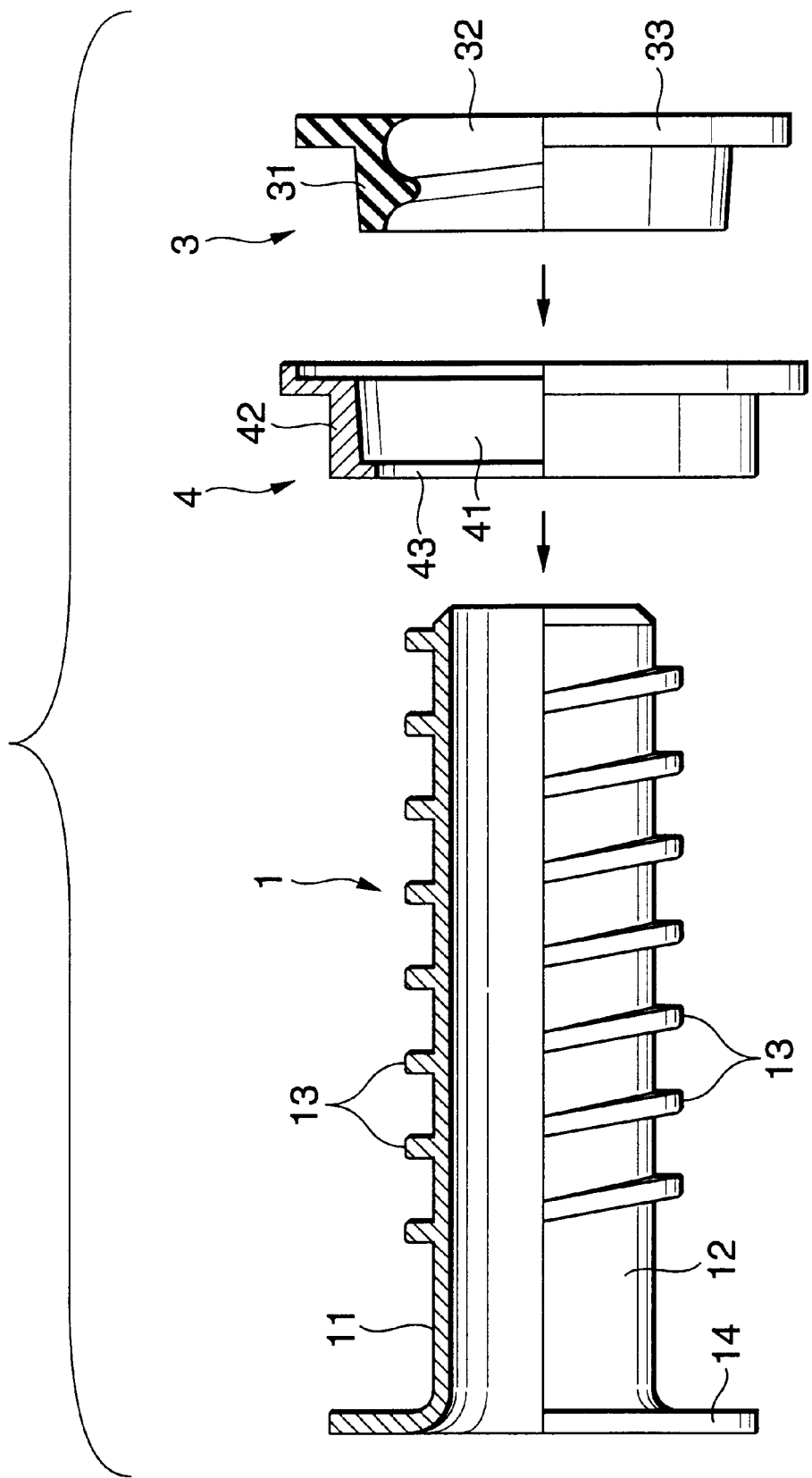
FIG. 9 is a partially cut-away front view of wall inside installation members respectively employed in the main embodiment shown in FIG. 8.
Figure 10:
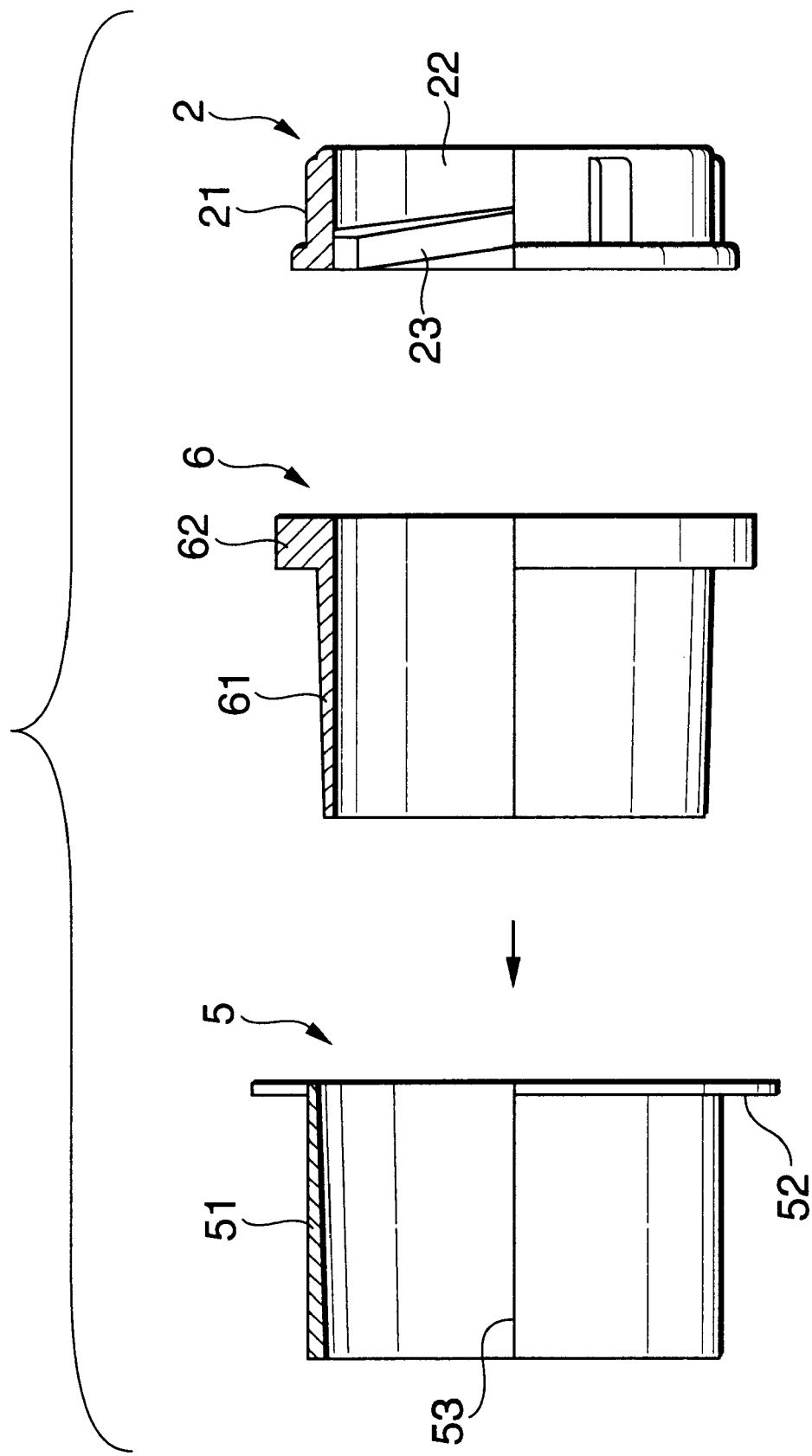
FIG. 10 is a partially cut-away front view of wall outside installation members respectively employed in the main embodiment shown in FIG. 8.
Figure 11:
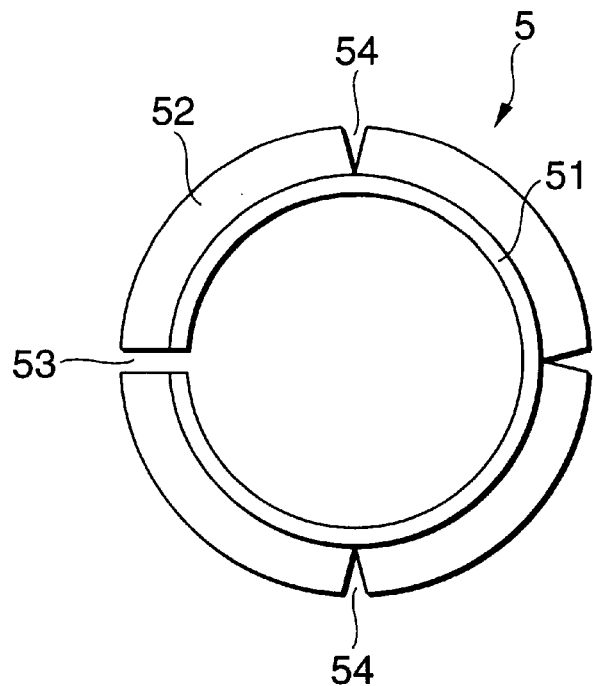
FIG. 11 a left side view of a C ring employed in the above main embodiment.
Figure 12:
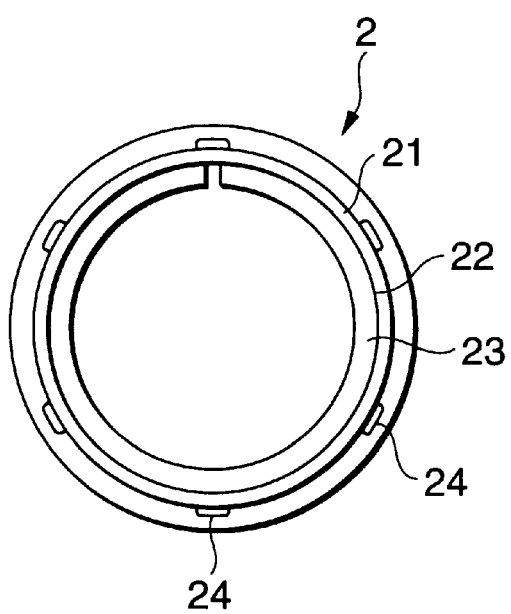
FIG. 12 a left side view of a holder employed in the above main embodiment.
Figure 13:
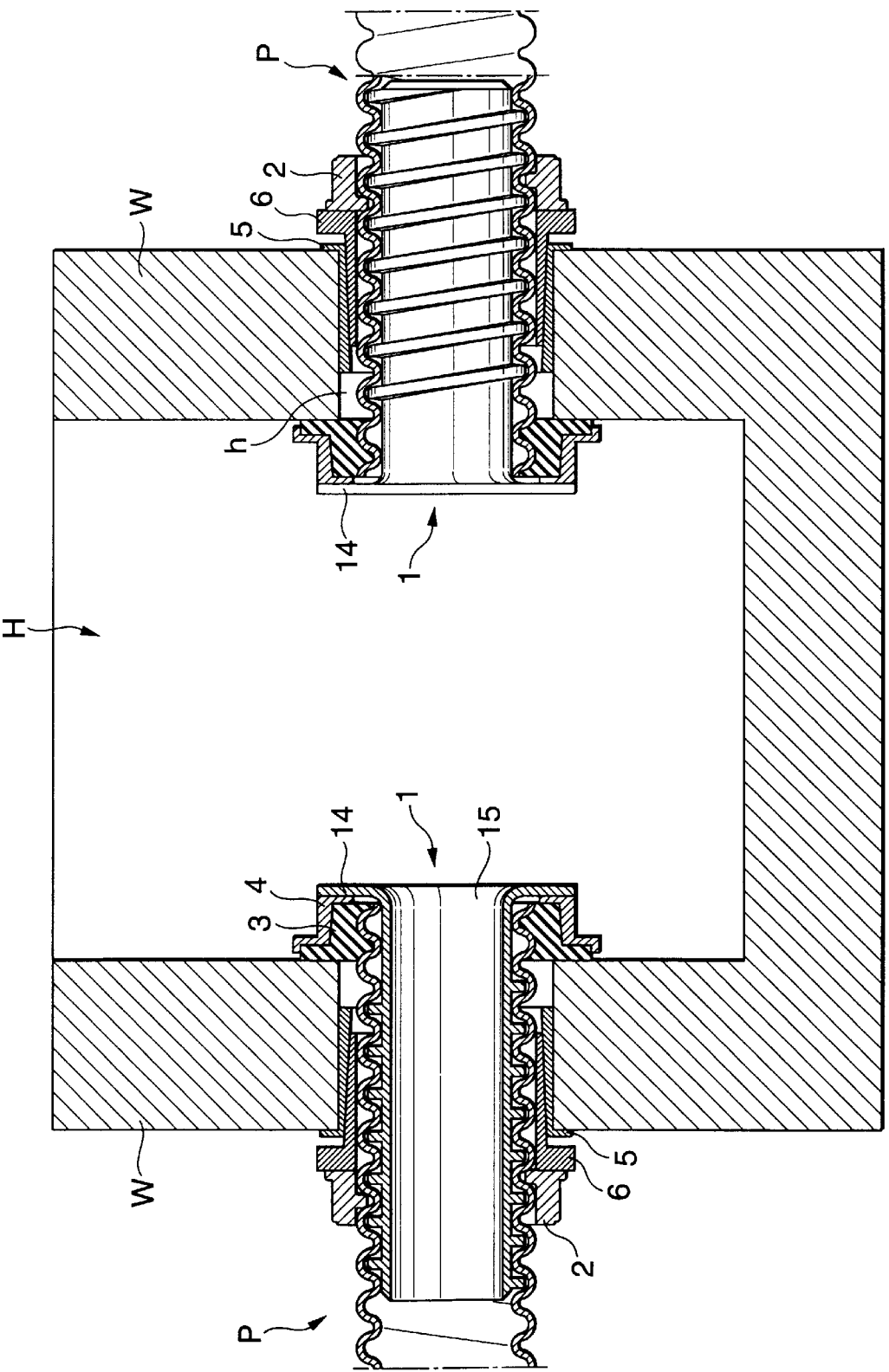
FIG. 13 is a longitudinal section view of the above main embodiment, showing how it is mounted onto a hand hole.

Now, description will be given below in detail of an embodiment of a connector relating to a second structure according to the invention. Here, FIGS. 8 to 13 respectively show a main embodiment of a connector relating to the second structure according to the invention: that is, in particular, FIG. 8 is a section view of the whole structure of the present embodiment, showing how it is used; FIG. 9 is an explanatory view of the respective shapes of a bellmouth, a washer member, and a packing member employed in the above embodiment; FIG. 10 an explanatory view of the respective shapes of a C ring, a spacer and a holder employed in the above embodiment; FIG. 11 is an explanatory view of the side surface shape of the C ring; FIG. 12 is an explanatory view of the side surface shape of the holder; and, FIG. 13 is an explanatory view of the present embodiment, showing how it is mounted onto the hand hole.

In other words, the above-mentioned main embodiment is illustrated herein as one of the preferred embodiments of a connector relating to the second structure according to the invention. Specifically, the present connector is composed of six components, that is, a bellmouth 1, a washer member 4, a packing member 3, a C ring 5, a spacer 6, and a holder 2. To construct the present connector, the bellmouth 1, washer member 4 and packing member 3 are disposed on one side of the wall member W, and the C ring 5, spacer 6 and holder 2 are disposed on the opposing side of the wall member W with the wall member W between them, in this order.

In the present embodiment, the bellmouth 1 is the same in structure as the bellmouth 1 employed in the first embodiment relating to the first structure according to the invention. That is, as shown in FIGS. 8 and 9, the present bellmouth 1 comprises a cylindrical-shaped portion 11 to be inserted through the opening end of a pipe member P, which forms a cable protection pipe line that is to be connected to the hand hole H, and fitted into the pipe member P, a radially projecting trumpet-shaped opening 15 which is used to guide a cable such as the electric wire or the like when the cable is inserted into or pulled out from the pipe member P, a flange portion 14 formed on the side of the opening 15 in such a manner as to project radially, and, a plurality of spiral-shaped engaging projections 13 which are integrally and projectingly provided on the outer periphery 12 of the cylindrical-shaped portion 11 in such a manner that they can be engaged with the spiral-shaped uneven inner peripheral surface of the pipe member P. The holder 2, similarly to the holder 2 employed in the above-mentioned first embodiment, includes, on the inner peripheral surface thereof, a plurality of projecting strips which can be threadedly engaged with the pipe member P. That is, as can be seen from FIGS. 8, 10 and 12, the holder 2 is formed in a cylindrical shape as a whole and includes, on the inner peripheral surface 22 of the cylindrical-shaped portion 23 thereof, a spiral-shaped projection 23 which extends almost a round of the inner peripheral surface 22 and also which can be engaged with the spiral-shaped corrugate portions of the outer peripheral surface of the pipe member P. Also, on the outer peripheral surface of the cylindrical-shaped portion 21, there are provided a plurality of slippage preventive ribs 24,—which extend along the peripheral direction of the outer peripheral surface.

Packing member 3, similarly to the packing member 3 employed in the above-mentioned first embodiment, is formed in a cylindrical shape. In particular, as shown in FIG. 8 and 9, the inner peripheral surface 32 of the packing 3 is previously formed in a spirally uneven shape so that, in use, it can be closely contacted with a spirally uneven outer peripheral surface of the pipe member P, while the outer surface of the packing 3 is composed of a disk-shaped portion 33 having a larger diameter and an upwardly tapered cylindrical-shaped portion 31 having a smaller diameter in such a manner that they are continuously connected to each other. Also, the washer member 4 includes a cylindrical-shaped portion 42 having a tapered inner surface 41 for receiving the tapered cylindrical-shaped portion 31 of the packing member 3, and a washer portion 43 which is disposed on one side of the cylindrical-shaped portion 42 and is used to press against the back surface of the packing member 3.

The C ring 5, as shown in FIGS. 8, 10, and 11, comprises a barrel portion 51 including a cut groove which is cut formed in such a manner as to extend along the axial direction of the barrel portion 51. The barrel portion 51 is structured such that one portion thereof is large in thickness, whereas the other portion thereof is small in thickness. In the end portion of the small-thickness portion of the barrel portion 51, there is provided a flange portion 52 which projects in the peripheral direction of the barrel portion 51, while the flange portion 52 includes a plurality of V-shaped notches 54. And, the spacer 6 comprises a tapered cylindrical-shaped portion 61 which can be fitted into the barrel portion 51 of the C ring 5 to thereby spread out the barrel portion 51, and a flange portion 62 which is provided on the end portion of the large-diameter side of the tapered cylindrical-shaped portion 61 and is projected in the peripheral direction of the spacer 6, while the flange portion 62 is larger in thickness than the tapered cylindrical-shaped portion 61.

According to the present embodiment, the bellmouth 1, fastening holder 2, washer member 4, C ring 5 and spacer 6 are all entirely formed of hard polyethylene resin material or the like by injection molding means which is generally known. And, the packing member 3 can be molded of rubber or highly elastic material mixed with rubber in an annular shape, or in an annular shape including in part a cut line extending along the axial direction thereof, or in a half cut cylindrical shape.

Next, description will be given below a first embodiment of a use in which the spiral-shaped pipe member P is connected to the hand hole H using the thus structured connector. At first, on the outside of the hand hole H, while rotating the holder 2 spirally, the holder 2 is moved from the end portion of the spiral-shaped pipe member P for forming a cable protection pipe line up to a position of the pipe member P, thereby fitting the holder 2 over the pipe member P. Next, the spacer 6 and C ring 5 are respectively fitted over the pipe member P, with the flange sides thereof preceding. In this state, the end portion of the pipe member P is inserted into the through hole h formed in the wall member (side wall) W from outside the hand hole H and is thereby projected into the hand hole H.

Next, in the interior portion of the hand hole H, after the packing member 3 and washer member 4 are respectively fitted over the end portion of the pipe member P, while rotating the bellmouth 1 spirally, the engaging projection 13 projecting from the outer peripheral surface 12 of the bellmouth 1 are engaged with the spirally uneven portions of the inner surface of the pipe member P so that the engaging projections 13 are inserted and fitted into the end portion of the pipe member P. In this state, with the pipe member P pulled out from the outside of the hand hole H, the packing member 3 is contacted with the inner surface of the wall member W; and, after then, the C ring 5 is inserted into the through hole h from outside the wall member W and, at the same time, the flange portion 62 of the spacer 6 is driven into the through hole h to thereby spread out the diameter of the C ring, so that the C ring 5 can be connected to the hole h. After then, the holder 2 fitted over the pipe member P is rotated oppositely to the above-mentioned direction to thereby move the same in the direction of the wall member W, the holder 2 is then contacted with the spacer 6 as shown in FIG. 8, the holder 2 is then fastened and rotated further to thereby give the bellmouth 1 through the pipe member P a pulling force which moves the bellmouth 1 outside the wall member W, so that the packing member 3 is pressed against not only the inner surface of the wall member W but also the outer peripheral surface of the pipe member P through the washer member 4.

Figure 14:
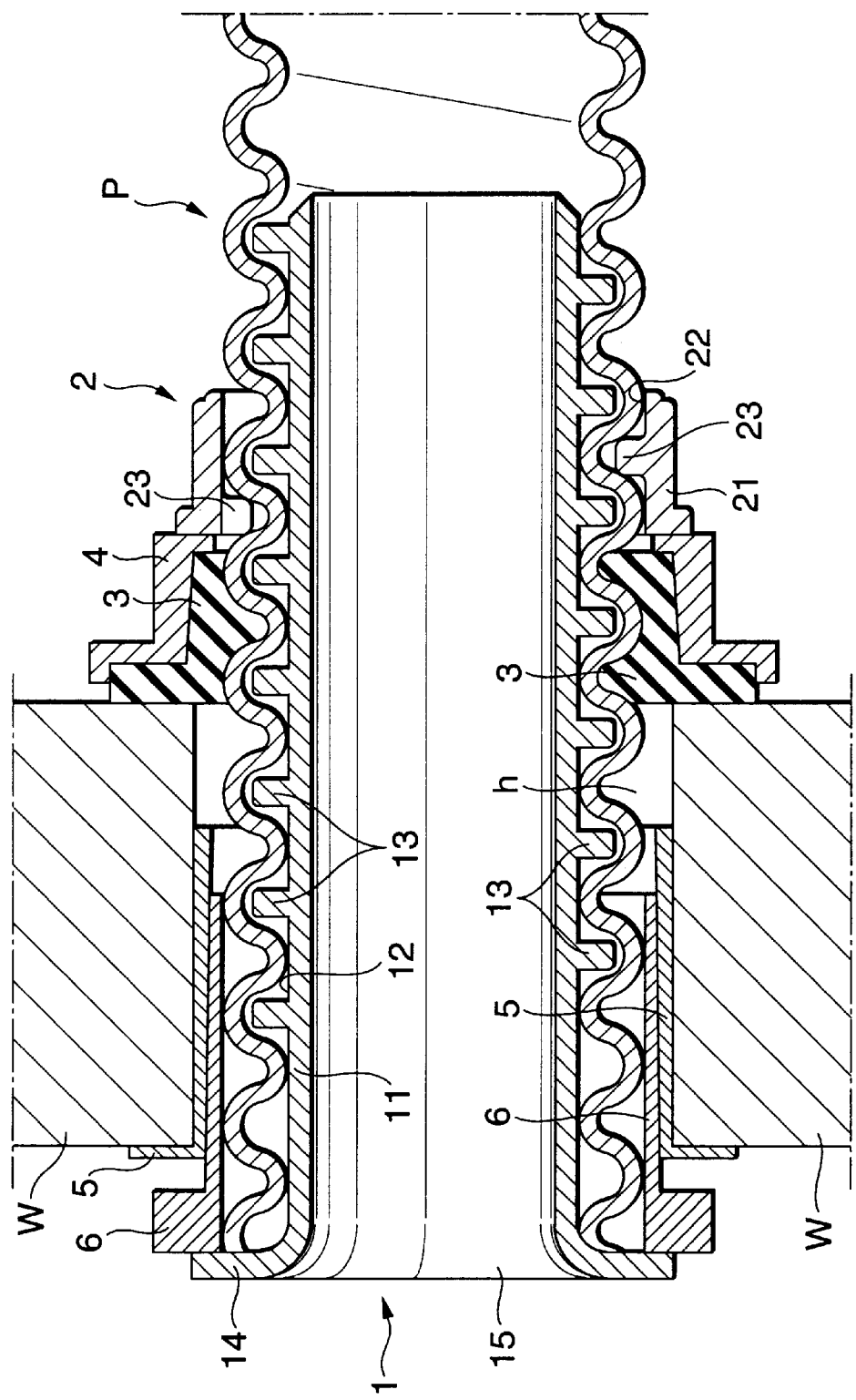
FIG. 14 is a longitudinal section view of a connector relating to the second structure according to the invention, showing a second example of use thereof, while the portions shown in FIG. 14 correspond to the portions shown in FIG. 8; and, FIG. 15 is a longitudinal section view of a connector relating to the second structure according to the invention, showing a third embodiment of use thereof, while the portions shown in FIG. 14 correspond to the portions shown in FIG. 8.

Now, FIG. 14 shows a second embodiment of the use of the connector relating to the second structure according to the invention; that is, FIG. 14 is a section thereof, showing the same portions as those shown in FIG. 8. In this embodiment, the present connector is used in the following manner. That is, the C ring 5 and spacer 6 are disposed on the pipe end portion that is situated in the inner surface of the wall member W, namely, on the bellmouth 1 mounting side, whereas the packing member 3 and washer member 4 are arranged on the outside that is opposed to the above-mentioned side with the wall member W between them. Thus, it should be noted there that a connector according to the invention can be used in this manner as well.

Figure 15:
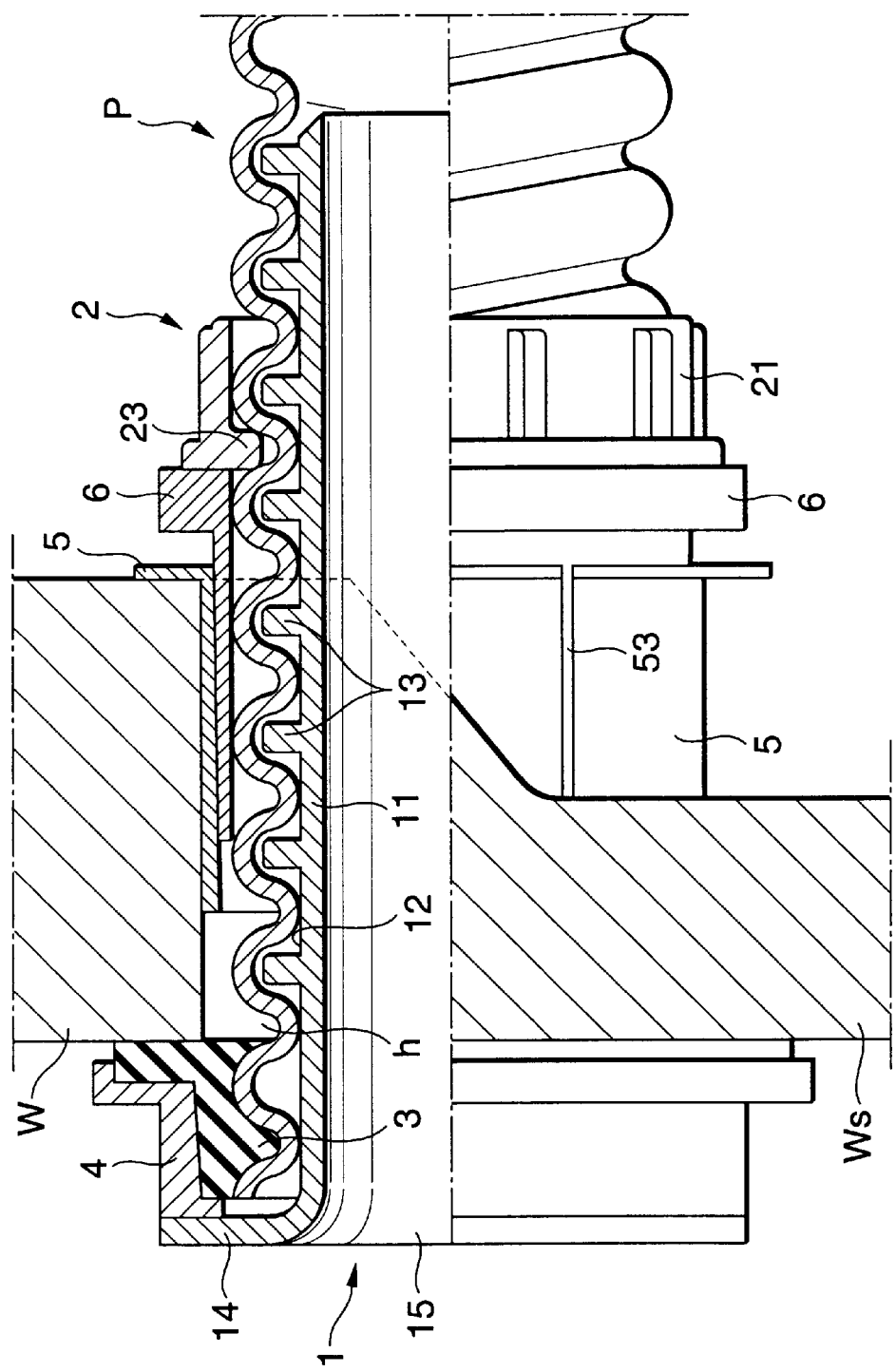

Now, FIG. 15 shows a third embodiment of use of the connector relating to the second structure according to the invention; that is, FIG. 15 is a partially sectional view, in which an outer appearance view is shown in the lower half section thereof and a section view is shown only in the upper half section thereof. In this embodiment, the thickness of the wall member W to which the pipe member P is to be connected is set in the following manner: that is, the upper half section of the through hole h has a large thickness, whereas the lower half section of the through hole h is formed as a wall member Ws having a small thickness. Therefore, a connector according to the invention can also be used with no trouble even if, as shown above, the through hole h portions to be connected by the pipe member are not uniform in thickness, and also when, although not shown, the wall surface of the wall member is uneven and not flat and smooth.

Although description has been given heretofore of the representative embodiments of the invention, the invention is not always limited to the embodiments illustrated herein but can be enforced by modifying the same properly, provided that such modification can satisfy the necessary conditions of the invention described herein, can accomplish the object of the invention, and can provide the effects of the invention that will be described hereinbelow.

As can be clearly seen from the foregoing description, a connector relating to a first structure according to the invention is structured such that the cylindrical-shaped portion of a bellmouth to be connected to a pipe member includes, on the outer periphery thereof, a plurality of engaging projections which can be engaged with the inner peripheral surface of the pipe member. Also, the present connector comprises, besides the bellmouth, not only a holder which includes, on the inner peripheral surface of a cylindrical-shaped portion thereof, a spiral-shaped projection to be engaged with the spiral-shaped portion of the outer periphery of the pipe member, but also a watertight packing member which is disposed on the wall member side of the holder. Due to this structure, an operation to mount and connect a spiral-shaped pipe member to a through hole formed in a hand hole or other wall members can be executed mechanically while eliminating the need for use of mortar which requires hardening, that is, a pipe member mounting operation can be carried out very easily and quickly. Also, as soon as the pipe member mounting operation is completed, an electric cable or the like can be wired and inserted into the pipe member. Therefore, the present structure can provide outstanding effects.

Also, a connector relating to a second structure according to the invention, as described before, comprises a bellmouth including on the outer periphery of a cylindrical-shaped portion thereof a plurality of engaging projections which can be engaged with the inner peripheral surface of a pipe member, a fastening holder including on the inner peripheral surface thereof a spiral-shaped projection which can be fitted with the outer periphery spiral-shaped portion of the pipe member, a watertight packing member, a C ring which can be spread out in diameter, and a spacer for spreading out the diameter of the C ring. Due to this structure, in the present connector, besides the above-mentioned effects of the first structure, there can be provided an outstanding effect that a spiral-shaped pipe member mounting and connecting operation can be executed quite easily and quickly regardless of the thicknesses and sizes of the hand hole or other pipe member mounting wall members, regardless of the uneven shapes and deformation of the wall surfaces of the wall members, and regardless of the sizes of through holes formed in the wall members.

The present invention is based on Japanese Patent Application No. Hei. 10-89267, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A connector for mounting a pipe member having a spiral-shaped wall to a through hole formed in a wall member, said connector comprising:

a bellmouth including an engaging projection which is formed on the outer periphery of a cylindrical-shaped portion thereof and is engageable with the inner peripheral surface of said pipe member;

a holder including a spiral-shaped projection which is formed on the inner peripheral surface of a cylindrical-shaped portion thereof and fittingly engageable with the outer periphery spiral-shaped portion of said pipe member; and a watertight packing member disposed on at least one of a first position between said wall member and said holder and a second position between said wall member and a flange of said bellmouth.

2. A connector for mounting a pipe member to a wall member as set forth in claim 1, further comprising:

a washer member interposed on at least one of a position between said watertight packing member and said flange of said bellmouth and a position between said watertight packing member and said holder.

3. A connector for mounting a pipe member to a wall member as set forth in claim 2, wherein said wall member including said through hole is the side wall of a manhole or a hand hole.

4. A connector for mounting a pipe member to a wall member as set forth in claim 2, wherein said wall member is a side wall forming a peripheral portion of a hand hole or a manhole.

5. A connector for mounting a pipe member to a wall member as set forth in claim 4, wherein said wall member including said through hole is the side wall of a manhole or a hand hole.

6. A connector for mounting a pipe member to a wall member as set forth in claim 1, wherein said wall member is a side wall forming a peripheral portion of a hand hole or a manhole.

7. A connector for mounting a pipe member to a wall member as set forth in claim 6, wherein said wall member including said through hole is the side wall of a manhole or a hand hole.

8. A connector for mounting a pipe member to a wall member as set forth in claim 1, wherein said wall member including said through hole is the side wall of a manhole or a hand hole.

9. A connector for mounting a pipe member having a spiral-shaped wall to a through hole formed in a wall member, said connector comprising:
- a bellmouth including a spiral-shaped engaging projections which is formed on the outer periphery of a cylindrical-shaped portion thereof and is engageable with the inner peripheral spiral-shaped portion of said pipe member, and also including, one end side thereof, a flange projecting in an outwardly radial direction thereof;
- a fastening holder including a spiral-shaped projection which is formed on the inner peripheral surface of a cylindrical-shaped portion thereof and is fittingly engageable with the outer periphery spiral-shaped portion of said pipe member;
- annular-shaped watertight packing member disposed on at least one of a position between the wall member and said flange of said bellmouth and a position between the wall member and said holder;
- a C-shaped ring including a barrel portion with a cut groove extending in the axial direction thereof and a flange portion projecting in an outwardly radial direction thereof, said C-shaped ring being disposed on the opposing side to said watertight packing member about said wall member and also being disposed on at least one of a position between the wall member and said holder and a position between the wall member and said flange of said bellmouth; and,
- a cylindrical-shaped tapered spacer which is fitted into said C-shaped ring, to thereby spread out said barrel portion of said C-shaped ring.

10. A connector for mounting a pipe member to a wall member as set forth in claim 9, wherein said wall member is a side wall forming peripheral portion of a a hand hole or a manhole.

11. A connector for mounting a pipe member to a wall member as set forth in claim 10, wherein said wall member including said through hole is the side wall of a manhole or a hand hole.

12. A connector for mounting a pipe member to a wall member as set forth in claim 9, wherein said wall member including said through hole is the side wall of a manhole or a hand hole.

13. A connector for mounting a pipe member having a spiral-shaped wall to a through hole formed in a wall member, said connector comprising:
- a bellmouth including an engaging projection which is engageable with the inner peripheral surface of said pipe member and a flange radially extended in an outwardly radial direction thereof;
- a holder including a spiral-shaped projection which is formed on the inner peripheral surface of a cylindrical-shaped portion thereof and fittingly engageable with the outer periphery spiral-shaped portion of said pipe member; and
- a waterproof packing member disposed on at least one of a position between said wall member and said holder and a position between said wall member and said flange.

14. A connector for mounting a pipe member to a wall member as set forth in claim 13, further comprising:
- a C-shaped ring including a barrel portion with a cut groove extending in the axial direction thereof and a flange portion projecting in radial direction thereof, said C-shaped ring being disposed on the opposing side to said watertight packing member about said wall member and also being disposed on at least one of a position between the wall member and said holder and a position between the wall member and said flange of said bellmouth; and
- a cylindrical-shaped tapered spacer which is fitted into said C-shaped ring, to thereby spread out said barrel portion of said C-shaped ring,
- wherein said barrel portion and an cylindrical shaped tapered portion of said cylindrical-shaped tapered spacer are interposed between said wall member and said pipe member in a radial direction of said pipe member.

15. A connector for mounting a pipe member to a wall member as set forth in claim 14, further comprising:
- a washer member interposed on at least one of a position between said watertight packing member and said flange of said bellmouth and a position between said watertight packing member and said holder.

16. A connector for mounting a pipe member to a wall member as set forth in claim 15, wherein said wall member is a side wall forming a peripheral portion of a hand hole or a manhole.

* * * * *